United States Patent [19]

Jira et al.

[11] Patent Number: 4,710,558

[45] Date of Patent: Dec. 1, 1987

[54] PROCESS FOR STABILIZING ORGANOPOLYSILOXANES

[75] Inventors: Reinhard Jira, Burghausen; Ralph Ottlinger, Murnau, both of Fed. Rep. of Germany

[73] Assignee: Wacker Chemie GmbH, Munich, Fed. Rep. of Germany

[21] Appl. No.: 891,997

[22] Filed: Aug. 1, 1986

[30] Foreign Application Priority Data

Oct. 3, 1985 [DE] Fed. Rep. of Germany ....... 3535379

[51] Int. Cl.$^4$ .............................................. C08G 77/06
[52] U.S. Cl. ....................................... 528/14; 528/18; 528/33; 528/37
[58] Field of Search ................... 528/14, 18, 33, 37

[56] References Cited

U.S. PATENT DOCUMENTS 3,779,987  12/1973  Razzano ................................ 528/37

*Primary Examiner*—Melvyn I. Marquis

[57] ABSTRACT

A process for stabilizing organopolysiloxanes containing alkaline compounds such as alkali metal hydroxides, alkali metal silanolates, alkali metal siloxanolates, or a mixture of at least two such compounds, which comprises neutralizing the alkaline compound present in the organopolysiloxanes with a neutralizing agent selected from a compound containing carbon, hydrogen, and oxygen atoms, and optionally at least one halogen atom, in which the compound has 2, 3 or 4 hydrocarbon groups bonded to the same carbon atom via oxygen, or an acylacetic acid ester. The resultant organopolysiloxanes are stabilized against viscosity changes caused by the alkaline compounds.

10 Claims, No Drawings

PROCESS FOR STABILIZING ORGANOPOLYSILOXANES

The present invention relates to stabilized organopolysiloxanes, particularly to a process for stabilizing organopolysiloxanes and more particularly to a process for stabilizing organopolysiloxanes containing alkaline compounds.

BACKGROUND OF THE INVENTION

Organopolysiloxanes containing alkali metal hydroxides are neutralized by the addition of neutralizing agents such as toluene sulfonic acid, phosphoric acid, acetic acid and allyl bromide in accordance with the procedure described in U.S. Pat. No. 3,779,987 to Razzano. The resultant organopolysiloxanes are stabilized against viscosity changes caused by the presence of the alkaline compounds.

It is, therefore, an object of the present invention to stabilize organopolysiloxanes against viscosity changes. Another object of the present invention is to stabilize organopolysiloxanes containing alkaline compounds. Another object of the present invention is to stabilize organopolysiloxanes by the addition of a neutralizing agent which neutralizes the alkaline compounds present in the organopolysiloxanes. Still another object of the present invention is to provide stabilized organopolysiloxanes which remain clear and colorless even after storage for at least 6 months at room temperature. A further object of the present invention is to stabilize organopolysiloxanes with a neutralizing agent for the alkaline compounds, which is noncorrosive to metals, can be easily removed by distillation and have a relatively low toxicity. A still further object of the present invention is to stabilize organopolysiloxanes with a neutralizing agent for the alkaline compounds which can be easily dispersed in the organopolysiloxanes and does not impart unpleasant odors to the neutralized organopolysiloxanes.

SUMMARY OF THE INVENTION

The foregoing objects and others which will become apparent from the following description are accomplished in accordance with this invention, generally speaking, by providing a process for stabilizing organopolysiloxanes against viscosity changes caused by alkaline compounds selected from the group consisting of alkali metal hydroxides, alkali metal silanolates or alkali metal siloxanolates, or a mixture of at least two such alkaline compounds, which comprises neutralizing organopolysiloxanes containing alkaline compounds with a neutralizing agent selected from the group consisting of a compound containing carbon, hydrogen and oxygen atoms, and optionally at least one halogen atom, in which 2, 3 or 4 hydrocarbon groups are bonded to the same carbon atom via oxygen and an acylacetic acid ester, in which the neutralizing agents are liquid at room temperature at 1020 hPa (abs.) and have a boiling point up to 200° C. at 1020 hPa (abs.)

DESCRIPTION OF THE INVENTION

Any organopolysiloxanes containing alkaline compounds such as alkali metal hydroxides, alkali metal silanolates or alkali metal siloxanolates, or mixtures containing at least two such alkaline compounds which have been or could have been stabilized against viscosity changes can be stabilized against viscosity changes by the process of the present invention. These organopolysiloxanes preferably have the formula $$AO(SiR_2O)_mA$$

where R represents the same or different monovalent hydrocarbon radicals or substituted monovalent hydrocarbon radicals in which the substituents are not too alkali-sensitive, A is hydrogen or a radical having the formula $$-SiR_3$$

where R is the same as above, and m is an integer having a value of at least 50.

Some of the $SiR_2O$ units of the organopolysiloxanes can be substituted by other siloxane units, which are generally present as more or less impurities. Examples of such units are units of the formula $RSiO_{3/2}$, where R is the same as above, or $SiO_{4/2}$ units, or mixtures of such units. It is preferred that not more than a total of about 5 mol percent of the $SiR_2O$ units be substituted by other siloxane units.

The monovalent hydrocarbon radicals represented by R in the above formulas, or the SiC-bonded hydrocarbon radicals in the organopolysiloxanes to be stabilized according to the present invention are, for example, alkyl radicals such as the methyl, ethyl, n-propyl, isopropyl, n-butyl, sec-butyl and 2-ethylhexyl as well as the octadecyl radical; hydrocarbon radicals having aliphatic carbon-carbon double bonds, such as vinyl and allyl radicals; aryl radicals such as phenyl and xenyl radicals; alkaryl radicals such as the tolyl and xylyl radicals; and aralkyl radicals such as the benzyl radical.

The monovalent substituted hydrocarbon radicals represented by R in the above formulas, or the SiC-bonded substituted hydrocarbon radicals in the organopolysiloxanes to be stabilized according to the present invention, are especially those containing halogen in the group that is not too alkalisensitive, such as 3,3,3-trifluoropropyl, o-, m- and p-chlorophenyl, 1,1,2,2-tetrafluoroethoxypropyl and 1,1,2,2,3,3-hexafluoropropyloxypropyl.

At least 50 percent of the number of SiC-bonded organic radicals in the organopolysiloxanes to be stabilized in accordance with the present invention, or of the R radicals in the above formulas, are preferably methyl radicals due to their availability. The other organic radicals which may optionally be present are preferably vinyl or phenyl or mixtures of these radicals.

The viscosity of the organopolysiloxanes, which is to be stabilized according to the present invention against changes caused by alkaline compounds in said organopolysiloxanes, is preferably $1 \times 10^3$ to $5 \times 10^7/mm^2.s^{-1}$ at 252° C.

The process of the present invention is preferably employed for organopolysiloxanes having the above formula in which A is hydrogen or a group having the formula $-SiR_3$, such as trimethylsilyl or dimethylvinylsilyl, or a portion of the radicals A is hydrogen and the remaining radicals A have the formula $-SiR_3$.

The alkali metal hydroxides, alkali metal silanolates or alkali metal siloxanolates which can be neutralized by the process of this invention encompass any such compounds which were present in the organopolysiloxanes and could be neutralized heretofore.

The alkaline compounds are present in the organopolysiloxanes because they have been used as catalysts in the condensation (polymerization) and/or equilibration reaction in the synthesis of the organopolysiloxanes.

Examples of alkali metal hydroxides which may be present in the organopolysiloxanes to be neutralized in accordance with the present invention are lithium hydroxide, sodium hydroxide, potassium hydroxide, rubidium hydroxide or cesium hydroxide, or mixtures of at least two of these alkali metal hydroxides. Sodium hydroxide and potassium hydroxide are the preferred alkali metal hydroxides due to their availability.

An example of an alkali metal silanolate is potassium methylsilanolate, which is also known as potassium methylsiliconate.

Examples of alkali metal siloxanolates are the potassium dimethylsiloxanolates. Such alkali metal siloxanolates can also be formed, e.g., by the condensation (polymerization) and/or equilibration of cyclic or linear dimethylpolysiloxanes in the presence of an alkali metal hydroxide.

The alkaline compound is usually present in the organopolysiloxanes to be stabilized in accordance with the present invention in an amount of from 0.0001 to about 0.1 weight percent and more preferably from about 0.0005 to about 0.01 weight percent, calculated as the elemental alkali metal and based on the weight of the organopolysiloxanes.

Compounds consisting of carbon, hydrogen and oxygen atoms, which may optionally contain at least one halogen atom, and have 2, 3 or 4 hydrocarbon groups bonded to the same carbon via oxygen, preferably have the formulas $CO(OR^1)_2$, where $R^1$ represents the same or different monovalent hydrocarbon radicals having from 1 to 10 carbons per radical which are free of aliphatic carbon-carbon multiple bonds, $R^2C(OR^1)_3$, where $R^1$ is the same as above and $R^2$ is hydrogen, halogen or a halogenated monovalent hydrocarbon radical having from 1 to 10 carbons per radical which is free of aliphatic carbon-carbon multiple bonds or $C(OR^1)_4$ where $R^1$ is the same as above.

Examples of hydrocarbon radicals represented by $R^1$ are alkyl radicals such as methyl, ethyl, n-propyl, isopropyl, n-butyl, sec-butyl, tert-butyl and the 2-ethylhexyl radical; aryl radicals such as the phenyl radical and the xenyl radical; alkaryl radicals such as the tolyl radical and the xylyl radical; and aralkyl radicals such as the benzyl radical.

The examples given for the $R^1$ hydrocarbon radicals also apply to hydrocarbon radicals represented by $R^2$; however, the hydrocarbon radicals represented by $R^2$ preferably contain up to 3 carbons per radical. The examples of halogenated hydrocarbon radicals represented by R are also applicable for the $R^2$ halogenated radicals.

Specific examples of compounds having the formula $CO(OR^1)_2$, i.e., of carbonic acid esters, are dimethyl carbonate and diethyl carbonate.

Specific examples of compounds having the formula $R^2C(OR^1)_3$, i.e., of orthocarboxylic acid esters, are trimethyl orthoformate, triethyl orthoformate and trimethyl orthoacetate.

Specific examples of compounds having the formula $C(OR^1)_4$ i.e., of orthocarbonic acid esters, are tetramethyl orthocarbonate and tetraethyl orthocarbonate.

The acylacetic acid esters which can also be used as neutralizing agents in accordance with the present invention preferably have the formula $R^1COCH_2COOR^1$ where $R^1$ is the same as above. Specific examples of such $\beta$-keto esters are methyl acetoacetate and ethyl acetoacetate.

A single compound may be used in accordance with the present invention, or mixtures of two or more different compounds may be used as neutralizing agents.

The neutralizing agents used in accordance with this invention are preferably used in an amount of from 1 to 5 gram-equivalents of hydrocarbon group bonded to carbon via oxygen per gram atom of alkali metal.

In the process of this invention, the alkaline compound present in the organopolysiloxane is neutralized by mixing the neutralizing agent with the organopolysiloxane to be stabilized.

The process of this invention is preferably conducted at a temperature of from about −5° C. up to about 200° C. and more preferably from room temperature to about 180° C. The process may be carried out at the pressure of the ambient atmosphere, i.e., at 1020 hPa (abs.), or at higher pressures.

The process of the present invention may be carried out batchwise, semi-continuously or as a continuous process.

In order to obtain good internal distribution of the materials in the process of this invention, the mixture of materials is preferably agitated, e.g., in a planetary mixer, kneader or a gear pump.

After neutralization, the excess neutralizing agent and by-product formed as a result of the reaction of the neutralizing agent with alkaline compound are preferably distilled off, preferably under reduced pressure.

The organopolysiloxanes stabilized in accordance with the process of the present invention may be used for all purposes for which organopolysiloxanes stabilized by prior methods against viscosity changes due to alkaline compounds could be used. For example, they may be used as thread lubricants, as well as for other uses where noncondensable organopolysiloxane oils have been used. In addition, these stabilized organopolysiloxanes may be used to produce organopolysiloxane elastomers and antistick coatings.

EXAMPLE 1

About 500 g of a dimethylpolysiloxane having one Si-bonded hydroxyl group in each terminal unit and a viscosity of 120 mm$^2$.s$^{-1}$ at 25° C. is heated to 150° C. in a kneader. Potassium hydroxide is kneaded into the heated organopolysiloxane at the rate of 10 ppm by weight (weight parts per million weight parts) based on the weight of the organopolysiloxane and the resultant mixture is then kneaded at 10 to 1000 Pa (abs.) and at 150° C. until it reaches a viscosity of approximately 30,000 mm$^2$.s$^{-1}$ at 25° C. About 0.04 g of dimethyl carbonate is then kneaded into the resultant organopolysiloxane at a temperature of 150° C. Kneading is continued at 150° C. for 30 minutes at approximately 1000 hPa (abs.) and then 10 minutes at 10 to 1000 Pa (abs.). The resulting organopolysiloxane has a viscosity of 31,000 mm$^2$.s$^{-1}$ at 25° C. and is clear and colorless. Even after 6 months of storage at room temperature, no change can be detected in the viscosity or appearance of the organopolysiloxane.

EXAMPLE 2

A mixture containing 370 g of a dimethylpolysiloxane having one Si-bonded hydroxyl group in each terminal unit and a viscosity of 120 mm$^2$.s$^{-1}$ at 25° C., 135 g of a dimethylpolysiloxane end-blocked by trimethylsiloxy groups and having a viscosity of 100 mm$^2$.s$^{-1}$ and 0.05 g of potassium hydroxide is stirred for 6 hours at 80° C. and at 10 to 1000 Pa (abs.), and then mixed with 0.61 g of tetramethyl orthocarbonate and heated to 150° C. Stirring is then continued at 150° C. for 30 minutes at approximately 1000 hPa (abs.) and for another 10 minutes at 10 to 1000 Pa (abs.). To determine whether neutralization of the potassium hydroxide is complete, a sample of the resultant organopolysiloxane is heated for 2 hours at 200° C. The resulting weight loss is 1.3 weight percent based on the weight of the sample before heating. The viscosity of the organopolysiloxane before mixing with the tetramethyl orthocarbonate is 1013 mm$^2$.s$^{-1}$ at 25° C. After mixing with the tetramethyl orthocarbonate and after further stirring, the viscosity is 1033 mm$^2$.s$^{-1}$. The stabilized organopolysiloxane is clear and colorless. Even after the organopolysiloxane has been stored for 6 months at room temperature, there is no detectable change in viscosity or appearance.

EXAMPLE 3

About 500 g of a dimethylpolysiloxane having one Si-bonded hydroxyl group in each terminal unit and a viscosity of 120 mm$^2$.s$^{-1}$ at 25° C. is heated to 150° C. in a kneader. Potassium hydroxide is kneaded into the heated organopolysiloxane at 10 ppm by weight based on the weight of the organopolysiloxane and the resultant mixture is then kneaded at 10 to 1000 Pa (abs.) and at 150° C. until it reaches a viscosity of about 50,000 mm$^2$.s$^{-1}$. About 0.046 g of ethyl acetoacetate is kneaded into the resultant organopolysiloxane at 150° C. Kneading is then continued at 150° C. for 30 minutes at approximately 1000 hPa (abs.) and for 10 minutes at 10 to 1000 Pa (abs.). The resultant organopolysiloxane has a viscosity of 54,700 mm$^2$.s$^{-1}$ and is clear and colorless. Even after storing the organopolysiloxane for 6 months, there is no change in its viscosity or appearance.

EXAMPLE 4

About 500 g of a dimethylpolysiloxane having one Si-bonded hydroxyl group in each terminal unit and a viscosity of 120 mm$^2$.s$^{-1}$ at 25° C. is heated to 150° C. in a kneader. Potassium dimethylsiloxanolate (about 20 dimethylsiloxane units per potassium atom) is kneaded into the heated organopolysiloxane at about 0.1 weight percent based on the weight of the organopolysiloxane and the resultant mixture is then kneaded at 10 to 1000 Pa (abs.) and at 150° C. until it has a viscosity of approximately 20,000 mm$^2$.s$^{-1}$ at 25° C. About 0.08 g of dimethyl carbonate is kneaded into the resultant organopolysiloxane at 150° C. Kneading is then continued at 150° C. for 30 minutes at approximately 1000 hPa (abs.) and for 10 minutes at 10 to 1000 Pa (abs.). The resultant organopolysiloxane has a viscosity of 22,000 mm$^2$.s$^{-1}$ at 25° C. and is clear and colorless. Even after 6 months of storage at room temperature, no change can be detected in the viscosity or appearance of the organopolysiloxane.

What is claimed is:

1. A process for stabilizing organopolysiloxanes against viscosity changes which contain alkaline compounds selected from the group consisting of alkali metal hydroxides, alkali metal silanolates, and alkali metal siloxanolates or a mixture of at least two of such alkaline compounds which comprises neutralizing the alkaline compounds with a neutralizing agent selected from the group consisting of a compound consisting of carbon, hydrogen and oxygen atoms, in which 2, 3 or 4 hydrocarbon groups are bonded to the same carbon atoms via oxygen, a compound consisting of carbon, hydrogen, oxygen and at least one halogen atom, in which 2, 3 or 4 hydrocarbon groups are bonded to the same carbon atom via oxygen, and an acylacetic acid ester in which the neutralizing asgent is a liquid at room temperature at 1020 hPa (abs ) and has a boiling point up 200° C. at 1020 hPa (abs.).

2. The process of claim 1, wherein the neutralizing agent consists of a compound containing carbon, hydrogen, oxygen and at least one halogen atom.

3. The process of claim 1, wherein the neutralizing agent is a carbonic acid ester fo the formula

CO(OR$^1$)$_2$, wherein R$^1$ is a hydrocarbon radical having from 1 to 10 carbons per radical and is free of aliphatic carbon-carbon multiple bonds.

4. The process of claim 3, wherein the carbonic acid ester is dimethyl carbonate.

5. The process of claim 1, wherein the neutralizing agent is an orthocarboxylic acid ester of the formula

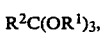

R$^2$C(OR$^1$)$_3$, wherein R$^1$ is a hydrocarbon radical having from 1 to 10 carbon atoms per radical and is free of aliphatic carbon-carbon multiple bonds and R$^2$ is selected from the group consisting of hydrogen, halogen and a halogenated monovalent hydrocarbon radical having from 1 to 10 carbons per radical which is free of aliphatic carbon-carbon multiple bonds.

6. The process of claim 5, wherein the orthocarboxylic acid ester is trimethyl orthoformate.

7. The process of claim 1, wherein the neutralizing agent is an orthocarbonic acid ester of the formula

C(OR$^1$)$_4$, wherein R$^1$ is a hydrocarbon radical having from 1 to 10 carbon atoms per radical and is free of aliphatic carbon-carbon multiple bonds.

8. The process of claim 7, wherein the orthocarbonic acid ester is tetramethyl orthocarbonate.

9. The process of claim 1, wherein the neutralizing agent is an acylacetic acid ester having the formula $$R^1COCH_2COOR^1,$$

wherein $R^1$ is a hydrocarbon radical having from 1 to 10 carbon atoms per radical and is free of aliphatic carbon-carbon multiple bonds.

10. The process of claim 9, wherein the acylacetic acid ester is ethyl acetoacetate.

* * * * *